(12) United States Patent
Beale et al.

(10) Patent No.: US 10,951,353 B2
(45) Date of Patent: *Mar. 16, 2021

(54) WIRELESS TELECOMMUNICATIONS

(71) Applicant: Sony Corporation, Tokyo (JP)

(72) Inventors: Martin Warwick Beale, Basingstoke (GB); Shin Horng Wong, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,846

(22) Filed: Sep. 24, 2019

(65) Prior Publication Data

US 2020/0021390 A1    Jan. 16, 2020

Related U.S. Application Data

(63) Continuation of application No. 15/751,510, filed as application No. PCT/EP2016/069826 on Aug. 22, 2016, now Pat. No. 10,469,197.

(30) Foreign Application Priority Data

Sep. 25, 2015 (EP) .................................... 15186993

(51) Int. Cl.
*H04W 4/40* (2018.01)
*H04W 4/46* (2018.01)
(Continued)

(52) U.S. Cl.
CPC ............ *H04L 1/0015* (2013.01); *H04L 1/003* (2013.01); *H04L 1/0028* (2013.01); *H04W 24/10* (2013.01);
(Continued)

(58) Field of Classification Search
CPC ........... H04W 4/46; H04W 4/48; H04W 4/44; H04W 8/08; H04W 4/38; H04W 4/40;
(Continued)

(56) References Cited

U.S. PATENT DOCUMENTS 7,904,102 B2 * 3/2011 Itaba ..................... H04W 76/10
455/515
9,208,390 B2 * 12/2015 Ludick .............. H04M 1/72569
(Continued)

FOREIGN PATENT DOCUMENTS

CN           1761182 A     4/2006
CN         101911753 A    12/2010
(Continued)

OTHER PUBLICATIONS

International Search Report and Written Opinion dated Oct. 7, 2016 for PCT/EP2016/069826 filed Aug. 22, 2016.
(Continued)

*Primary Examiner* — Faruk Hamza
*Assistant Examiner* — Abusayeed M Haque
(74) *Attorney, Agent, or Firm* — Xsensus LLP

(57) ABSTRACT

A terminal device for use in a wireless telecommunications system includes: a transceiver operable to perform wireless communication with one or more other terminal devices according to the wireless communications system and to receive speed information from the one or more other terminal devices indicative of a physical speed of the one or more other terminal devices; and a controller configured to select a transmission format, for use in wireless communication by the transceiver, in dependence upon the speed information received from the one or more other terminal devices.

21 Claims, 13 Drawing Sheets

(51) Int. Cl.
    *H04W 8/22*     (2009.01)
    *H04L 29/06*    (2006.01)
    *H04W 28/04*    (2009.01)
    *H04L 1/00*     (2006.01)
    *H04W 28/02*    (2009.01)
    *H04W 24/10*    (2009.01)

(52) U.S. Cl.
    CPC ....... *H04W 28/0226* (2013.01); *H04L 1/0003* (2013.01); *H04L 1/0009* (2013.01); *H04L 1/0046* (2013.01)

(58) Field of Classification Search
    CPC .. H04W 28/0226; H04L 1/0015; H04L 1/003; H04L 1/0003; H04L 1/0009
    See application file for complete search history.

(56) References Cited

U.S. PATENT DOCUMENTS

| | | | | |
|---|---|---|---|---|
| 9,386,499 | B2* | 7/2016 | Ohm | H04W 36/08 |
| 9,415,658 | B1* | 8/2016 | Makkar | B60G 17/0165 |
| 10,469,197 | B2* | 11/2019 | Beale | H04L 1/0015 |
| 2006/0039318 | A1 | 2/2006 | Oh et al. | |
| 2007/0007194 | A1* | 1/2007 | Yoshida | B60K 1/04 |
| | | | | 210/359 |
| 2008/0135520 | A1* | 6/2008 | Sun | C03C 19/00 |
| | | | | 216/89 |
| 2008/0153496 | A1* | 6/2008 | Fukuzawa | H04W 4/18 |
| | | | | 455/436 |
| 2008/0235520 | A1 | 9/2008 | Becker et al. | |
| 2008/0278314 | A1* | 11/2008 | Miller | G07C 5/008 |
| | | | | 340/539.13 |
| 2009/0034466 | A1* | 2/2009 | Lindskog | H04L 1/1685 |
| | | | | 370/329 |
| 2011/0009107 | A1* | 1/2011 | Guba | G08G 1/20 |
| | | | | 455/418 |
| 2011/0009139 | A1 | 1/2011 | Nagata et al. | |
| 2011/0257973 | A1 | 10/2011 | Chutorash et al. | |
| 2012/0062288 | A1* | 3/2012 | Belot | H03L 7/0995 |
| | | | | 327/156 |
| 2012/0138751 | A1* | 6/2012 | Richter | B64D 45/0005 |
| | | | | 244/214 |
| 2012/0155422 | A1 | 6/2012 | Medbo et al. | |
| 2012/0242513 | A1* | 9/2012 | Oguchi | G01M 17/0074 |
| | | | | 340/995.27 |
| 2013/0103296 | A1* | 4/2013 | Koshizen | G01C 21/3691 |
| | | | | 701/119 |
| 2013/0145297 | A1* | 6/2013 | Ricci | G08G 1/017 |
| | | | | 715/765 |
| 2013/0198802 | A1* | 8/2013 | Ricci | H04L 67/12 |
| | | | | 726/1 |
| 2013/0293364 | A1* | 11/2013 | Ricci | B60K 37/06 |
| | | | | 340/425.5 |
| 2014/0122700 | A1* | 5/2014 | Jung | G06F 21/6254 |
| | | | | 709/224 |
| 2014/0125286 | A1* | 5/2014 | Cho | B60L 53/36 |
| | | | | 320/128 |
| 2014/0136730 | A1* | 5/2014 | Wahler | H04W 4/024 |
| | | | | 709/242 |
| 2014/0280211 | A1* | 9/2014 | Rash | G06F 16/95 |
| | | | | 707/748 |
| 2014/0313357 | A1* | 10/2014 | Hasegawa | H04N 5/23203 |
| | | | | 348/211.2 |
| 2015/0078327 | A1 | 3/2015 | Medbo et al. | |
| 2015/0092661 | A1* | 4/2015 | Huang | H04W 40/248 |
| | | | | 370/315 |
| 2015/0116358 | A1 | 4/2015 | Choi et al. | |
| 2015/0149037 | A1* | 5/2015 | Lim | B60W 30/09 |
| | | | | 701/41 |
| 2015/0149059 | A1 | 5/2015 | Choi | |
| 2015/0170519 | A1* | 6/2015 | Langgood | G08G 1/163 |
| | | | | 701/117 |
| 2015/0245397 | A1 | 8/2015 | Sachs et al. | |
| 2016/0012650 | A1* | 1/2016 | Coloney | G09G 3/00 |
| | | | | 701/31.5 |
| 2016/0127983 | A1* | 5/2016 | Hageltorn | H04J 11/0083 |
| | | | | 455/456.6 |
| 2016/0174088 | A1* | 6/2016 | Yilmaz | H04W 36/0083 |
| | | | | 455/434 |
| 2016/0205665 | A1 | 7/2016 | Fukuta et al. | |
| 2016/0212596 | A1* | 7/2016 | Brahmi | H04W 72/042 |
| 2016/0219024 | A1* | 7/2016 | Verzun | G06F 21/606 |
| 2016/0255640 | A1* | 9/2016 | Zitzmann | H04W 60/02 |
| | | | | 455/452.1 |
| 2016/0293002 | A1* | 10/2016 | Ekin | G01S 19/13 |
| 2016/0344532 | A1* | 11/2016 | Bhat | H04W 72/1263 |
| 2016/0374136 | A1* | 12/2016 | Moisio | H04W 28/0236 |
| 2017/0004641 | A1* | 1/2017 | Ota | G06T 11/60 |
| 2017/0006449 | A1* | 1/2017 | Igumnov | H04W 4/024 |
| 2017/0024941 | A1* | 1/2017 | Nicholson | G07C 5/0808 |
| 2017/0032402 | A1* | 2/2017 | Patsiokas | G06Q 30/0261 |
| 2017/0201619 | A1* | 7/2017 | Cohen | H04L 67/34 |
| 2017/0245160 | A1* | 8/2017 | Rost | H04L 5/14 |
| 2017/0265045 | A1* | 9/2017 | Igumnov | H04W 4/90 |
| 2018/0219659 | A1* | 8/2018 | Wernersson | H04B 7/0626 |

FOREIGN PATENT DOCUMENTS

| | | |
|---|---|---|
| CN | 103370976 A | 10/2013 |
| CN | 103501543 A | 1/2014 |
| CN | 104670231 A | 6/2015 |
| EP | 2242301 A1 | 10/2010 |
| WO | 2015/029953 A1 | 3/2015 |

OTHER PUBLICATIONS

"New SI proposal: Feasibility Study on LTE-based V2X Services", LG Electronics, CATT, Vodafone, Huawei, 3GPP TSG RAN Meeting No. 68, RP-151109, Jun. 15-18, 2015, 7 pages.

Office Action dated Sep. 18, 2020, in corresponding Chinese patent Application No. 201680055381.0, 18 pages.

* cited by examiner

WIRELESS TELECOMMUNICATIONS

CROSS-REFERENCE TO RELATED APPLICATIONS

The present application is a continuation of U.S. application Ser. No. 15/751,510, Feb. 9, 2018, which is based on PCT filing PCT/EP2016/069826, filed Aug. 22, 2016, and claims priority to EP 15186993.0, filed Sep. 25, 2015, the entire contents of each are incorporated herein by reference.

TECHNICAL FIELD OF THE DISCLOSURE

The present disclosure relates to wireless telecommunications.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art or may not form part of the state of the art at the time of filing, are neither expressly or impliedly admitted as prior art or state of the art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is increasing rapidly and expected to continue to increase. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications is introduced. Communication devices that are operated by a user for these purposes may be referred to as user equipment (UE).

D2D communications allow communications devices that are in close proximity to directly communicate with each other, both when within and when outside of a coverage area or when the network fails. This D2D communications ability allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Other types of relatively new protocols, features, arrangements or sets thereof of mobile telecommunications systems include for example relay node technology which can extend the coverage for base station or another node for communicating with terminals, in terms of throughput and/or geographical coverage. Small cells may also be provided wherein a small cell can be controlled by a base station or operate as a base station with a limited coverage (either geographically or in the terminals accepted by the small cell, e.g. only terminals associated with a specific customer/company account may be able to connect to it). As a result, a variety of technologies, some of them alternative and other compatible technologies, can now be used in a mobile telecommunication system.

In parallel, the development of vehicle-related communications has emerged and attracted a growing interest. These communications can sometimes be called vehicle-to-everything (V2X) communications which can refer to any one or combination of the following: vehicle-to-vehicle (V2V) communications, vehicle-to-infrastructure (V21), vehicle-to-pedestrians (V2P) communications, vehicle-to-home (V2H) communications and any other type of vehicle-to-something communications. They enable a vehicle to communicate with its environment, be it another vehicle, a traffic light, a level (railroad) crossing, infrastructure equipment in the vicinity of a road, a pedestrian, a cyclist, etc. In a typical V21 scenario, V21 communications is used for collision prevention, driver alerting and/or other intersection related activity. In this kind of embodiment, the V2X-enabled terminal has to find out the relevant Road-Side Unit (RSU) to connect to and exchange information with. More generally, this new set of technologies can enable a variety of features such a convoying of vehicles, safety features, environmental friendly car driving and/or management and can also facilitate the operation of driverless/autonomous cars.

Whilst D2D communications techniques can provide an arrangement for communicating between devices, D2D is generally targeting public safety uses, so-called machine type communication (MTC) applications—which tend to be low-throughput and high-latency communications—or conventional terminals. Also, the D2D communications techniques are generally based on existing mobile network communications techniques which have not been built with applications such as V2X in mind. As a result, they are not designed to deal with high speed terminals as can be found in a V2X environment. As a result, the present telecom systems and arrangements, and in particular D2D ones, face a large number of problems to become suitable or more suitable for V2X or V2X-like types of communications, in particular in respect of V2X or V2X-like communications for fast-moving terminals.

SUMMARY

The present disclosure can address or mitigates the problems discussed above.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EXAMPLE EMBODIMENTS

Figure 1:
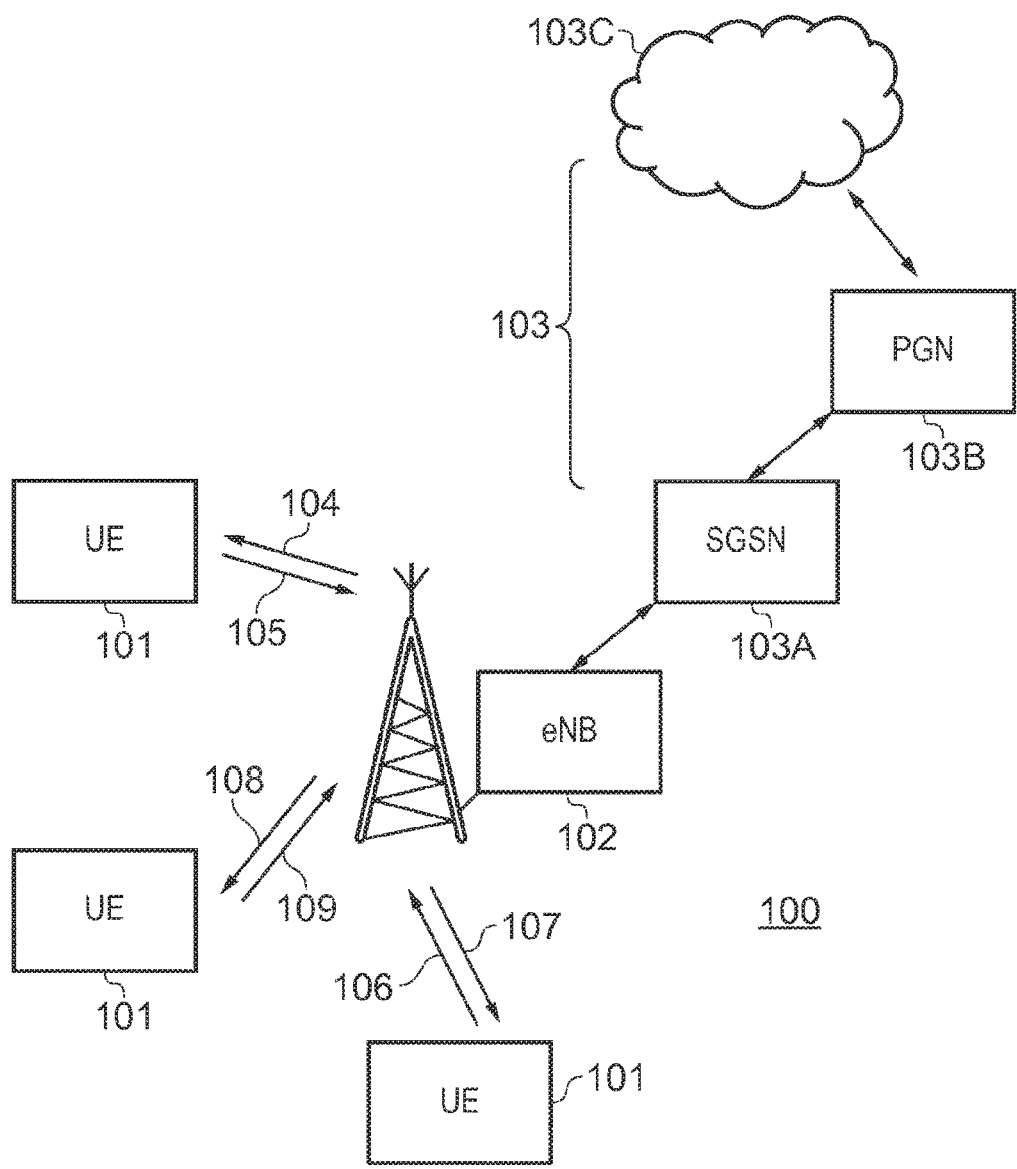
FIG. 1 schematically illustrates a mobile telecommunications system.

FIG. 1 provides a schematic diagram of a mobile telecommunications system 100, where the system includes mobile communications terminals (such as UEs) 101, infrastructure equipment 102 and a core network 103.

The infrastructure equipment may also be referred to as a base station, network element, enhanced Node B (eNodeB or eNB) or a coordinating entity for example, and provides a wireless access interface to the one or more communications terminals within a coverage area or cell. The one or more mobile communications terminals may communicate data via the transmission and reception of signals representing data using the wireless access interface. The infrastructure equipment 102 is communicatively linked to core network components such as a serving gateway support node (SGSN) 103A, a packet gateway node 103B and an external network 103C, which may be connected to one or more other communications systems or networks which have a similar structure to that formed from communications terminals 101 and infrastructure equipment 102.

The core network 103 may also provide functionality including authentication, mobility management, charging and so on for the communications terminals served by the network entity. The mobile communications terminals 101 of FIG. 1 may also be referred to as communications terminals, user equipment (UE), terminal devices and so forth, and are configured to communicate with one or more other communications terminals served by the same or a different coverage area via the infrastructure equipment. These communications may be performed by transmitting and receiving signals representing data using the wireless access interface over the two way communications links represented by lines 104 to 109, where 104, 106 and 108 represent downlink communications from the infrastructure equipment to the communications terminals and 105, 107 and 109 represent uplink communications from the communications terminals to the infrastructure equipment. The telecommunications system 100 may operate in accordance with a telecommunications protocol. For instance in some examples the system 100 may generally operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
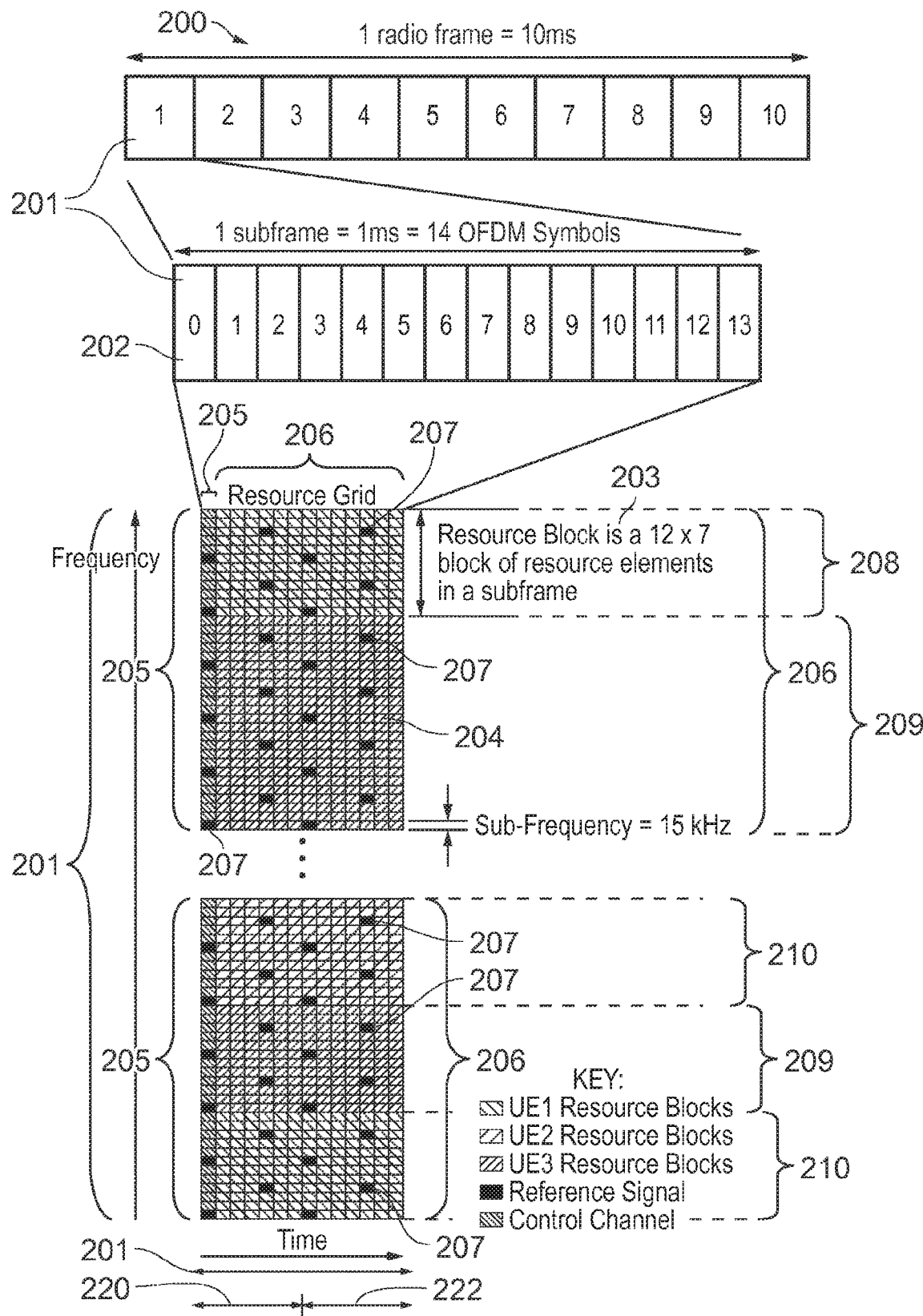
FIG. 2 provides a simplified schematic diagram of the structure of a downlink of a wireless access interface.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3A:
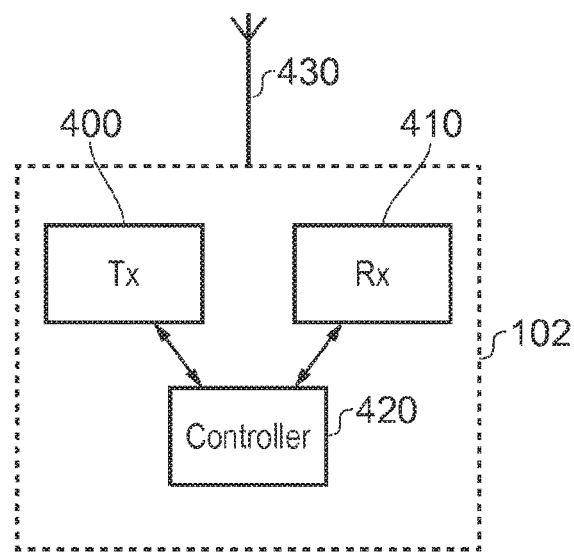
FIG. 3a schematically illustrates a base station.

FIG. 3a schematically illustrates a base station 102 in more detail. The base station 102 includes a transmitter (Tx) 400 for transmitting signals via a wireless access interface (and via an antenna 430) to the one or more communications devices or UEs, and a receiver (Rx) 410 to receive signals from the one or more UEs within the coverage area of the base station. A controller 420 controls the transmitter 400 and the receiver 410 to transmit and receive the signals via the wireless access interface. The transmitter 400 and receiver 410 together form a transceiver. The controller 420 may perform a function of controlling the allocation of communications resource elements of the wireless access interface and may in some examples include a scheduler for scheduling transmissions via the wireless access interface for both an uplink and the downlink. Operations of a base station discussed in connection with the description below may be undertaken or overseen, at least in part, by the controller 420. FIG. 3a therefore provides an example of a base station for use in a wireless telecommunications system, the base station comprising a transceiver 400, 410 configured to perform wireless communication with a terminal device; and a controller 420 configured to control the transceiver to send a wireless paging signal to the terminal device.

Figure 3B:
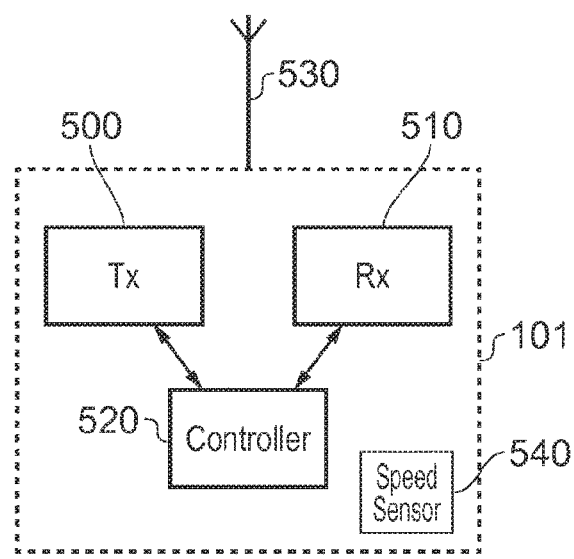
FIG. 3b schematically illustrates a terminal device or user equipment (UE)

FIG. 3b schematically illustrates a UE 101 in more detail. The UE 101 includes a transmitter 500 associated with an antenna 530 for transmitting signals on the uplink of the wireless access interface to the base station 102 and a receiver 510 for receiving signals transmitted by the base station 102 on the downlink via the wireless access interface. The transmitter 500 and the receiver 510 are controlled by a controller 520. The transmitter 500 and receiver 510 together form a transceiver. Operations of a UE discussed in connection with the description below may be undertaken or overseen, at least in part, by the controller 520. A speed sensor 540 is provided as an example of a speed detector to detect speed information indicative of a physical speed of the terminal device, for example a GPS sensor, a vehicle speed sensor such as a speedometer or a link to a speedometer, or the like. This provides speed information to the controller. In example embodiments of the present disclosure, the UE 101 is a so-called Low Complexity Machine Type Communication (LC-MTC) terminal device. FIG. 3b therefore provides an example of a terminal device for use in a wireless telecommunications system, the terminal device comprising: a transceiver 500, 510 configured to perform wireless communication with a base station; and a controller 520 configured to control the transceiver to detect a wireless paging signal from the base station.

The controller 520 controls the speed sensor 540 to detect the physical speed of the terminal device (which is assumed to be that of the vehicle or the like with which the terminal device is associated). The controller controls the transceiver to send information indicative of the detected speed using a format discussed below. The controller also controls the transceiver to receive speed information from the one or more other terminal devices indicative of a physical speed of the one or more other terminal devices. In some examples, either one or the other of these processes takes place at any one time. the controller can then select a transmission format for use in a transmission, or a prioritised transmission format in the case of a blind decoding situation, in dependence upon the detected speed information (and, in examples, in dependence upon the terminal's own speed for a transmission). In examples, the controller is configured to select a transmission format, for use in wireless communication by the transceiver, in dependence upon a detection of a highest speed amongst the speed information (for example, the received speed information and its own speed information). To respond to this information, the controller may be configured to select a transmission format from a set of formats having different respective robustness to transmission artefacts.

Figure 4:
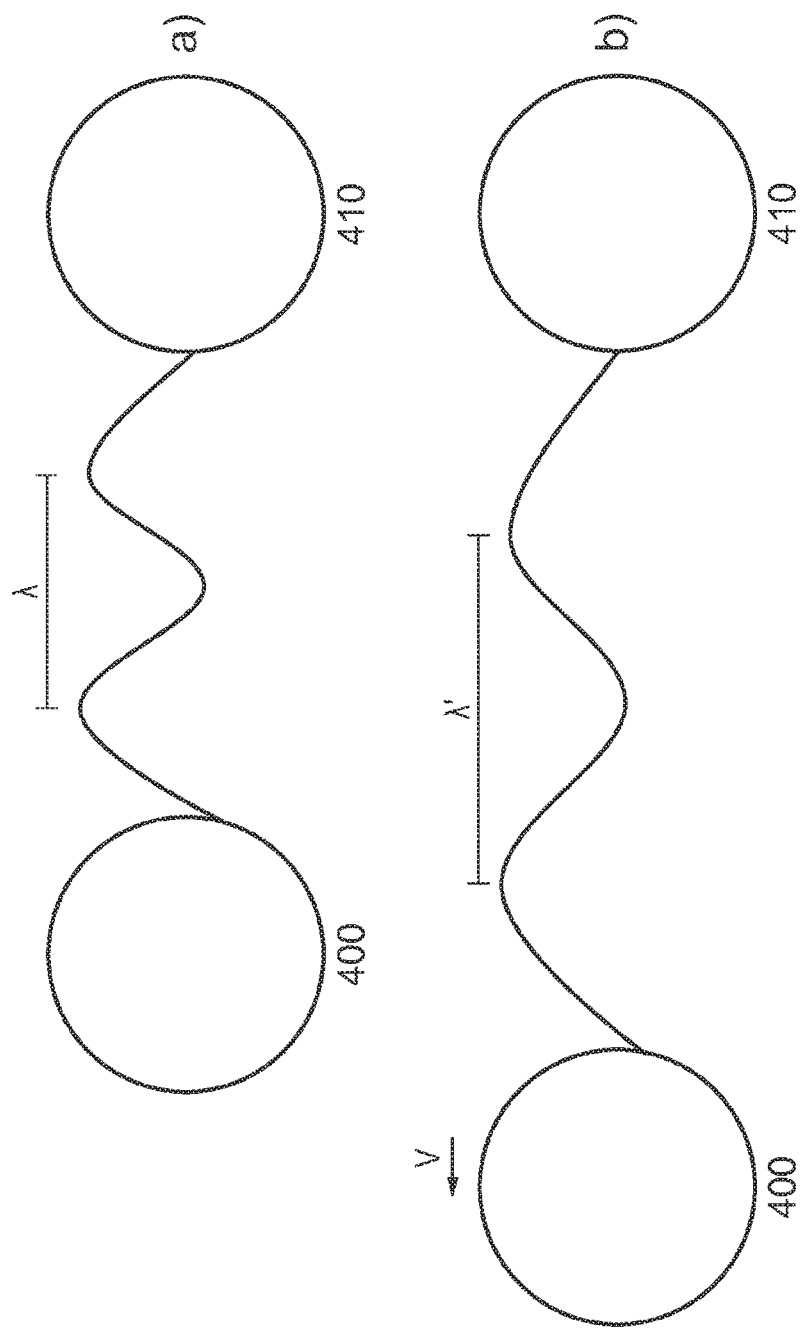
FIG. 4 schematically illustrates the Doppler Effect.

FIG. 4 schematically illustrates an example of the so-called Doppler Effect. The arrangement a) illustrates a transmitter 400 and receiver 410 that are stationary relative to each other, with a transmitted wave shown between them with a wavelength A. In the arrangement b), the transmitter 400 is no longer stationary and instead possesses a speed v away from the receiver 410. This causes the wavelength of the transmitted wave to appear larger than in a), the new wavelength being represented by A'. As the wave speed of the transmitted wave is independent of this motion, this means that the frequency of the wave is decreased from a) to b). The relationship between the speed of the transmitter away from the receiver and the frequency of the received wave is represented by the equation:

$$\Delta f = \frac{v}{c} f_0$$

Where $\Delta f$ is the Doppler shift (change in frequency), v is the relative speed of the transmitter measured with respect to the receiver, c is the wave speed of the transmitted wave and $f_0$ is the frequency at which the transmitted wave is emitted from the transmitter.

In the context of vehicle-to-vehicle communication, this shift may become appreciable; conventional LTE systems are able to compensate for frequency errors (i.e. frequency shifts) of up to 1 kHz, which for a frequency f of 6 GHz corresponds to a relative speed of around 180 km/h. For vehicles travelling in opposite directions (either towards each other or away from each other), this is a relative speed that may be reached quite easily and beyond this limit conventional LTE systems are unable to compensate for the shift and thus communications will fail. Therefore the existing LTE format may not be suitable in cases when the Doppler Effect becomes significant, as this may cause communication problems in systems in which transmitters and receivers are mobile and travel at high speed.

Figure 5:
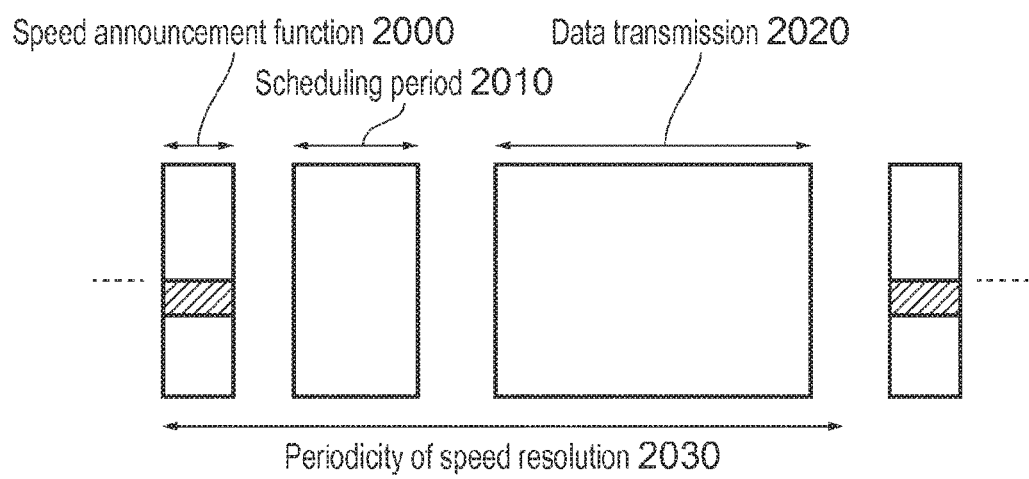
FIGS. 5 and 6 schematically illustrate communication formats.

FIG. 5 schematically illustrates a transmission format in which a speed announcement function or field 2000 is provided. This is a periodic notification that is inserted into a transmitted signal which is used to indicate the speed of the UE that is transmitting the signal. An example of the implementation of such a notification is the use of physical resource blocks (PRBs) that are allocated for the purpose of speed announcement, such that a transmitting UE that detects a transmission in a frequency band that corresponds to a speed announcement PRB is able to determine the speed at which the receiving UEs are travelling. The scheduling period 2010 and data transmission 2020 that follow the speed announcement function 2000 are transmitted in a format that corresponds to the indicated speed, as will be described below. In this case speed information would be transmitted according to the periodicity of speed resolution 2030, which is approximately every 100 ms based upon the time taken for the scheduling period 2010 and data transmission 2020 to be transmitted.

In some example embodiments, a receiving UE travelling at the lowest speed range (and therefore not necessarily transmitting a speed announcement itself) can detect the speed of other UEs by listening to the speed announcement information. From this it can prioritise or estimate a transmitting format that might be in use by other UEs).

Figure 6:
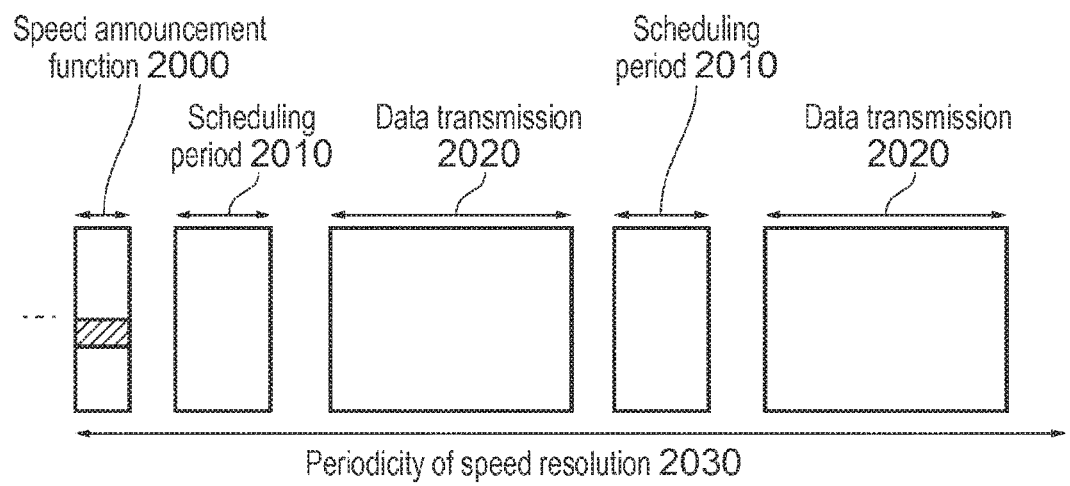
Figure 7:
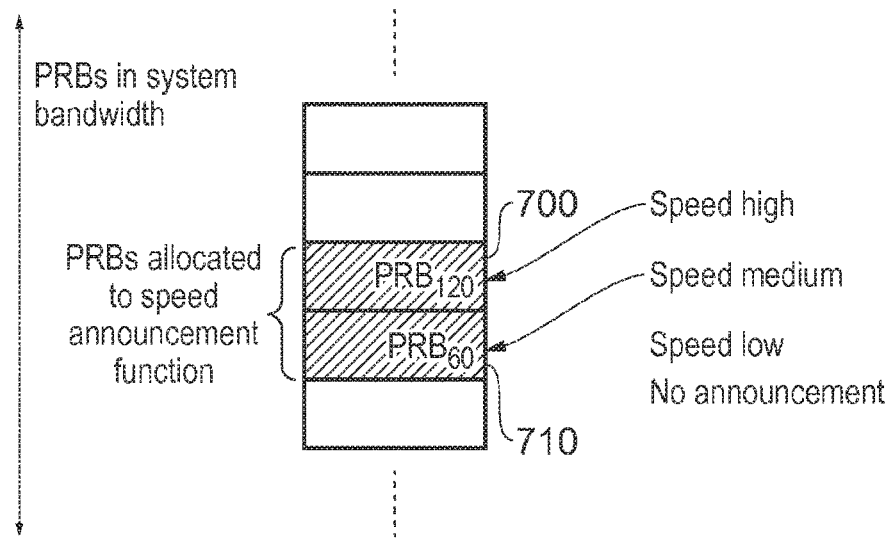
FIG. 7 schematically illustrates a speed signalling format.

FIG. 6 schematically illustrates a speed announcement function 2000 that is transmitted with a different periodicity to the scheduling period 2010 and data transmission 2020. In the example of this Figure, the speed announcement function 2000 is transmitted for a single instance for two or more corresponding scheduling periods 2010 and data transmission blocks 2020. However it is envisaged that the speed announcement function 2000 could be transmitted once per any integer number of scheduling periods 2010 and data transmission blocks 2020. This may be especially advantageous at lower speeds, as it is likely to be less required to transmit speed information so frequently. For example, a fast moving vehicle may wish to send speed indications more frequently to ensure that the data it is sending is decoded correctly as it may be less likely that all UEs in a newly entered area will be already configured to decode the high speed format. Therefore, the controller 520 is configured to control the transceiver to transmit the speed information indicative of the physical speed of the terminal device to the one or more other terminal devices. FIG. 7 schematically illustrates an example of a PRB implementation of the speed announcement function. In this implementation a pair of PRBs is used (for example, is reserved by the system, for example by a base station or road side unit, and/or by interaction of the terminal devices), each corresponding to a different level of speed; in this example a medium speed and a high speed. It is considered unnecessary in these examples to transmit an indication of a low speed transmitter, as this is sufficient for normal functioning of the communication standard, but in some embodiments this may be considered appropriate.

The speed sensor 540 provides speed information to the controller 520 which then applies a peak detection, averaging or other process in order to detect, at a particular instant or period in time, which speed range the terminal device is moving in. (In other embodiments an exact or rounded speed could be sent, but in the present embodiments a range of speeds is used).

In FIG. 7, $PRB_{120}$ 700 corresponds to a high speed transmitter, with an example lower threshold speed of 120 km/h. Similarly, $PRB_{60}$ 710 corresponds to a medium speed transmitter with a lower threshold speed of 60 km/h. These PRBs are known to any receiving UE, either as part of a standard that is defined for the UE or by notification from a network for example, and the detection of an amount of energy in these PRBs is interpreted to mean that the transmitter has a speed of over 120 km/h or between 60 km/h and 120 km/h respectively. This can be related to a transmission format of the received signal, allowing the receiving UE to determine how to decode the received signal. This use of PRBs could of course be extended to any number of speed categories, each with their own allocated PRB—for example, a medium speed could be $PRB_{40}$, a high speed $PRB_{90}$ and a very high speed $PRB_{140}$. Additionally, it is not considered essential that each speed category corresponds to the same range of speeds, for example $PRB_{50}$, $PRB_{70}$, $PRB_{100}$ and $PRB_{140}$ could be used.

The PRBs may be implemented using an arbitrary radio frequency signal that is modulated to occupy the appropriate PRB, or a correlation or synchronisation sequence could be present in the blocks. As an example of non-energy signal content of the PRB blocks, the PRACH sequences defined in existing 3GPP Releases could be used. Equally, any other sequences with good correlation properties that are not impacted by the UE speed would be suitable for such a function.

The use of an arbitrary modulation of this nature allows a simple test to be applied by a terminal device (such as a transmitting device) attempting to detect the speed of one or more other terminal device. The test is: does the relevant PRB have any transmitted energy in it? If so, then at least one of the potential recipient terminal devices is travelling at that speed range. It does not matter which one. If not, then no other terminal device (within communication range) is travelling at that speed or speed range.

In these examples, the speed information is transmitted periodically by the one or more other terminal devices; and the controller 520 is configured to control the transceiver to transmit the speed information indicative of the physical speed of the terminal device (for example, periodically) to the one or more other terminal devices. Using the reserved PRB arrangement, the controller 520 is configured to detect the speed information from the one or more other terminal devices from a transmission in one or more predetermined frequency bands and at one or more predetermined times. In particular, the controller is configured to detect a transmission in each of plurality of predetermined frequency bands, each corresponding to a different range of physical speeds of the one or more other terminal devices; and the controller is configured to transmit speed information relating to the speed of the terminal device in one or the plurality of predetermined frequency bands selected according to the detected speed of the terminal device.

The periodicity of occurrence of the PRBs used for speed announcement can be the same for all of the PRBs. In other examples, however, a periodicity of transmission is shorter for speed information indicative of a higher speed (such as $PRB_{120}$), compared to a periodicity of transmission for speed information indicative of a lower speed (such as $PRB_{60}$).

Figure 8:
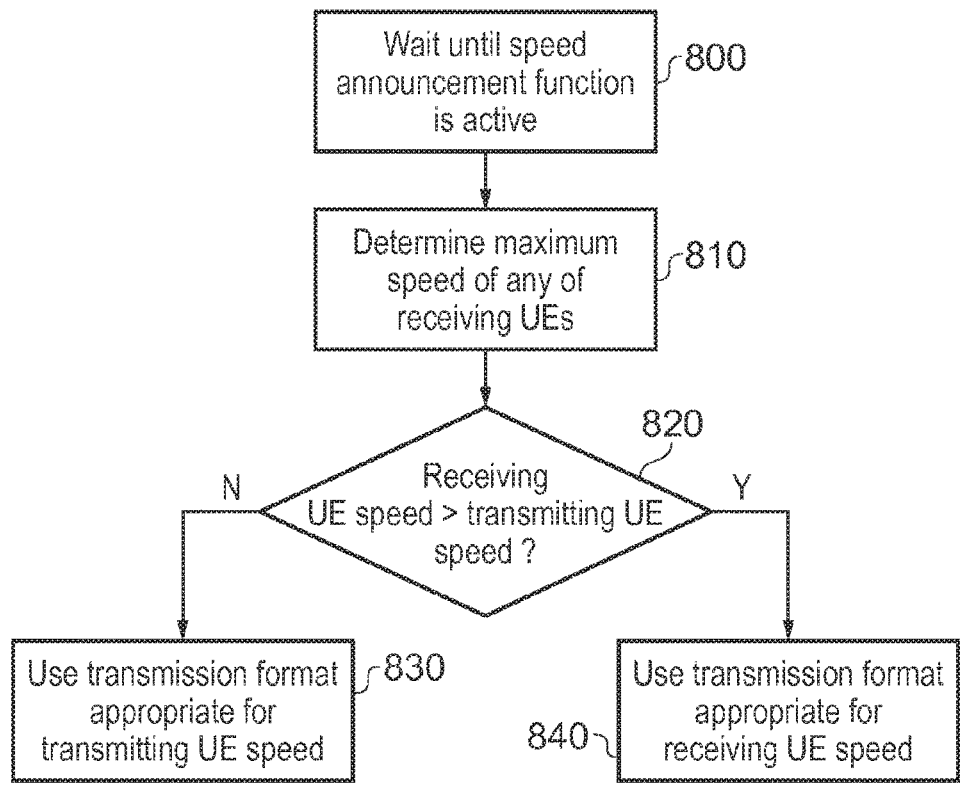
FIG. 8 schematically illustrates a transmission format determination process.

FIG. 8 schematically illustrates a process by which a UE is able to determine which transmission format should be employed for any transmissions originating from the UE. The process begins at step 800 with the UE waiting for a speed announcement function to be activated, for example by a network which the UE belongs to. Once this function has been activated, the process proceeds to step 810 in which the maximum speed of any receiving UEs is determined. This could be performed by waiting for communications from these UEs to be received that indicate their speed, or this could again be signalled by the network if the network is configured to receive speed information from each of the UEs associated with it. At step 820 it is determined whether the speed of the receiving UEs exceeds that of the UE performing the process. If this is not the case, then at step 830 a transmission format appropriate for the speed of the transmitting UE is selected. However if it is the case that the other UEs do possess a greater speed than the transmitting UE then at step 840 a transmission format appropriate for the speed of these other UEs is selected. Accordingly the UE controller 520 is configured to select a transmission format, for use in wireless communication by the transceiver, in dependence upon a detection of a highest speed amongst the speed information.

A blind decoding method may be used when communication signals are received by a UE, such that the receiving UE attempts to decode the communication signal using each of the formats sequentially until one is successful without attempting to establish the format that has been used beforehand. This blind decoding could be performed such that the high speed format is attempted first (as it may be deemed to be the most important, due to the increased risk of a collision with a fast moving vehicle), followed by the medium speed format and finally the low speed format. Alternatively, the medium speed format could be attempted first, as this could be the most likely format to be applied to communications (and even if the low speed is more likely, it would be lower priority due to the speed of the associated vehicles). In other examples, when a terminal device is at the lowest speed range (and so, in these examples, does not transmit speed information) the terminal device can detect speed information of other terminal devices and prioritise or order the blind decoding according to an estimated likely transmission format derived from speed announcement information that the terminal device can itself detect (which may or may not be the same as the speed announcement information that the actual transmitting terminal device is responsive to). The operations of FIG. 8 may be carried out by the controller 520 and provide an example of the controller being configured to select a transmission format, for use in wireless communication by the transceiver, in dependence upon the speed information received from the one or more other terminal devices.

Figure 9:
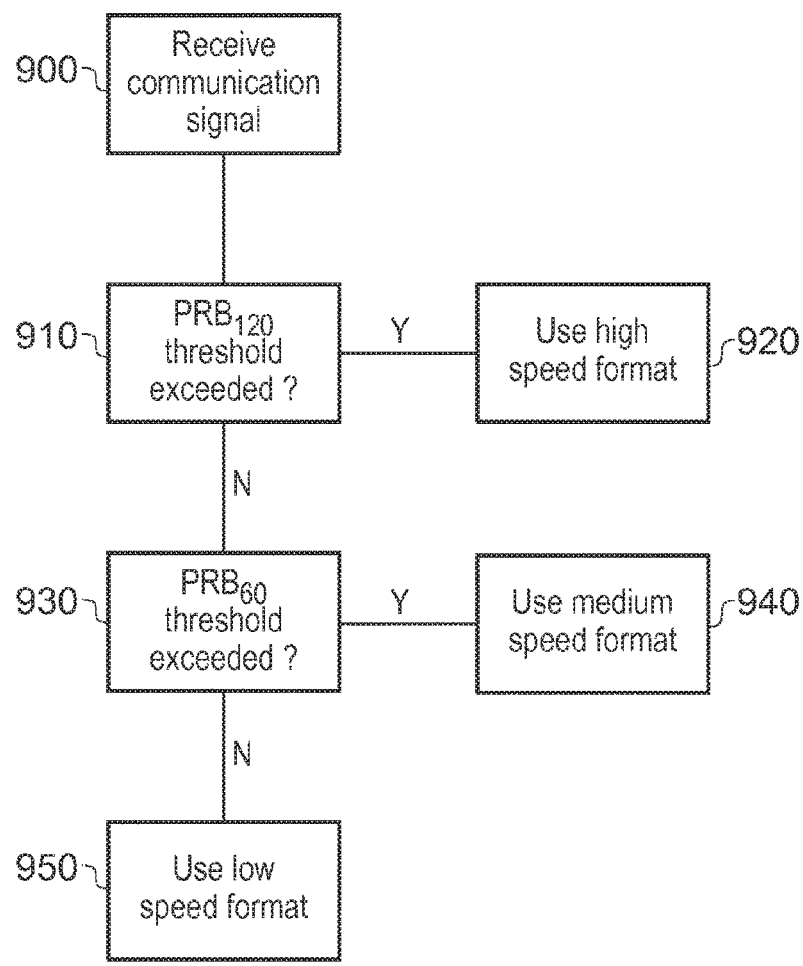
FIG. 9 schematically illustrates a decoding format selection process.

FIG. 9 schematically illustrates a process by which a UE is able to determine a likely communication format that should be used for decoding received signals. This process is an alternative to an embodiment in which blind decoding is used At a step 900 the communication signal is received by the UE, and at a step 910 it is determined whether or not there is a transmission in the $PRB_{120}$ frequency band that exceeds a threshold value. If such a transmission is detected then the process terminates at step 920 in which a communication format corresponding to a high speed is selected. This threshold could of course be 0, such that any transmission in the PRB frequency band is considered adequate for the high speed format to be used, or it could be higher so as to reduce the chance of false indications of a high speed or so as to only use a high speed format when a certain proportion of other UEs that are in communication with the receiving UE are using this format (this is discussed in more detail below).

If it is determined that the threshold value for the $PRB_{120}$ is not met, a detection of any transmission corresponding to the $PRB_{60}$ is implemented at step 930. If the threshold for this detection is met, the process terminates at step 940 with the selection of a medium speed format. If the threshold is not met, the process instead terminates at step 950 with the selection of a low speed format.

Many variations on this process are envisaged, for example the inclusion of extra detection steps corresponding to other PRBs if they are implemented. It is also considered that the thresholds relating to each of the PRBs could be different, for example a lower threshold may be considered for PRBs corresponding to higher speeds as a consequence of the higher speed of the associated UE; a UE that is travelling very quickly is likely to be considered more important in terms of receiving communications from them as they may be approaching the receiving UE quickly enough that the risk of a collision is much more imminent than a slower-approaching UE. Alternatively, due to the reduction in the amount of data that is carried by the higher speed format (as is discussed below), a higher threshold may be applied to the higher speeds as it is preferable that a medium or low speed format would be used so as to facilitate a faster data transmission. The order in which the PRBs are analysed for transmissions could also be varied, for example to account for the fact that a medium speed format may be more likely when a UE is associated with a vehicle being driven on a road other than a motorway due to lower speed limits.

In some examples, a more robust detection of high speed motion may be useful. In such examples, for transmission and/or reception in a frequency band indicative of a higher speed, the controller may be configured to use transmission or reception parameters which are different to those for use in respect of a frequency band indicative of a lower speed. For example, a higher transmitting power and/or greater receiver sensitivity and/or longer correlation length may be used for transmissions in PRBs indicative of higher speeds.

Figure 10:
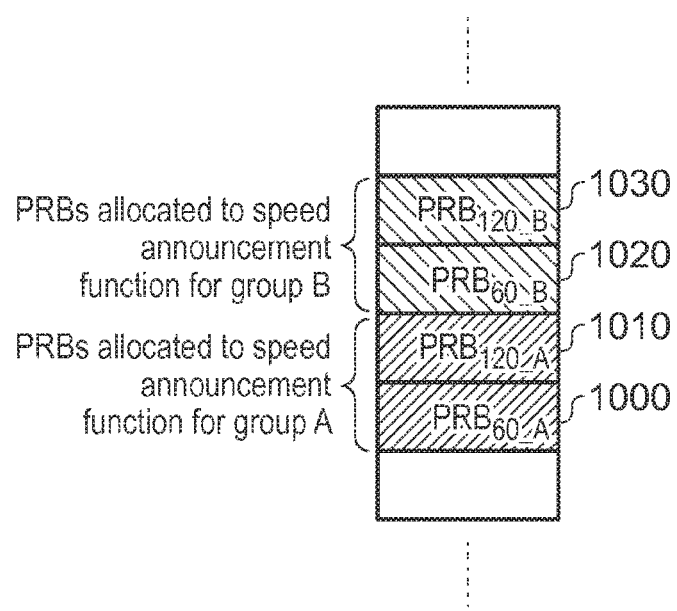
FIG. 10 schematically illustrates a speed signalling format with grouping.

FIG. 10 schematically illustrates a speed announcement function in which PRBs correspond to both a speed and a group. Grouping of UEs may be advantageous in embodiments where associated vehicles have no chance of interaction; an example of this could be those driving on a motorway with a smaller road nearby that does not intersect or vehicles travelling on a flyover that does not intersect with the road below it. The vehicles on the motorway would likely be travelling at a speed to as to cause the high speed format to be applied to communications while the vehicles on the smaller road would be likely to only be travelling at a speed that results in the use of a medium or low speed format. Grouping allows the communication format of each group of UEs to be determined independently of the other group. Without grouping vehicles on both roads would use the high speed format due to the proximity of the vehicles, this would result in the unnecessary limiting of the data rate at which the vehicles on the smaller road could communicate at. Grouping can be an assignment to one group or to multiple groups.

In FIG. 10, group A is provided with the PRBs $PRB_{120\_A}$ 1010 and $PRB_{60\_A}$ 1000 while group B is provided with $PRB_{120\_B}$ 1030 and $PRB_{60\_B}$ 1020. Of course each of these groups could have a greater number of PRBs assigned to it, and more than two groups could be specified in the speed announcement function. Individual UEs could be assigned to groups in a number of manners, for example by communication of their position to the network. Grouping could also be defined on a predetermined basis for either a whole road network or portions at which grouping would be particularly advantageous, and UEs could be supplied with positioning information by an external device and able to determine which group is appropriate by comparing this position with the predetermined information. Roadside units could also be used to indicate to a UE which group it should belong to, as a further example.

This is therefore an example of the plurality of frequency bands comprises two or more groups of frequency bands, each corresponding to a different group of terminal devices. Alternatively, grouping could be performed on the basis of a device type. An example of this could be the use of drones, which may operate within the range of vehicles on the road but have very little chance of a collision due to the vertical separation. The UE in this case could be defined to be part of a specific group, or only be aware of the locations of the relevant PRBs for that group. This group information could be built into the device, or indicated by a SIM card or other network-dependent module. In general, the controller is configured to interact with configuration data stored at the terminal device and/or the one or more other terminal devices and/or a base station in order to detect one or more groups to which the terminal device is assigned. The configuration data is indicative of a type of vehicle with which the terminal device is associated. For example, the controller 520 may be configured to detect, from the base station, a type of location of the terminal device, the group being assigned to the terminal device according to the type of location. In examples, the controller is not responsive to speed information indicative of the speed of one or more other terminal devices in a different group to the group assigned to the terminal device.

A terminal device employing these features, for use in a wireless telecommunications system, comprises a transceiver operable to perform wireless communication with one or more other terminal devices according to the wireless communications system and to interact with configuration data stored at the terminal device and/or the one or more other terminal devices and/or a base station in order to detect a group to which the terminal device is assigned; and a controller configured to select a transmission format, for use in wireless communication by the transceiver, in dependence upon the group to which the terminal device is assigned.

In examples, the controller 520 is configured to select a transmission format from a set of formats having different respective robustness to transmission artefacts. FIGS. 11-15 relate to transmission formats applicable to the techniques described above. These are merely examples and are not an exhaustive list or set of possible transmission formats, but are used to illustrate potential differences between transmission formats and the use of a selection of formats from which a particular terminal device may select an appropriate transmission format.

The diagrams are arranged to show different sub carrier frequency on a vertical axis and the 14 symbols of a single sub frame along a horizontal axis. By comparison with FIG. 2 described above, this represents a portion of the resource grid 206 as described. Note that although only a portion is shown in FIGS. 11-15, this is for clarity of the diagram and ease of discussion; the principals described could apply to the whole of the resource grid or to a part of it.

Figure 11:
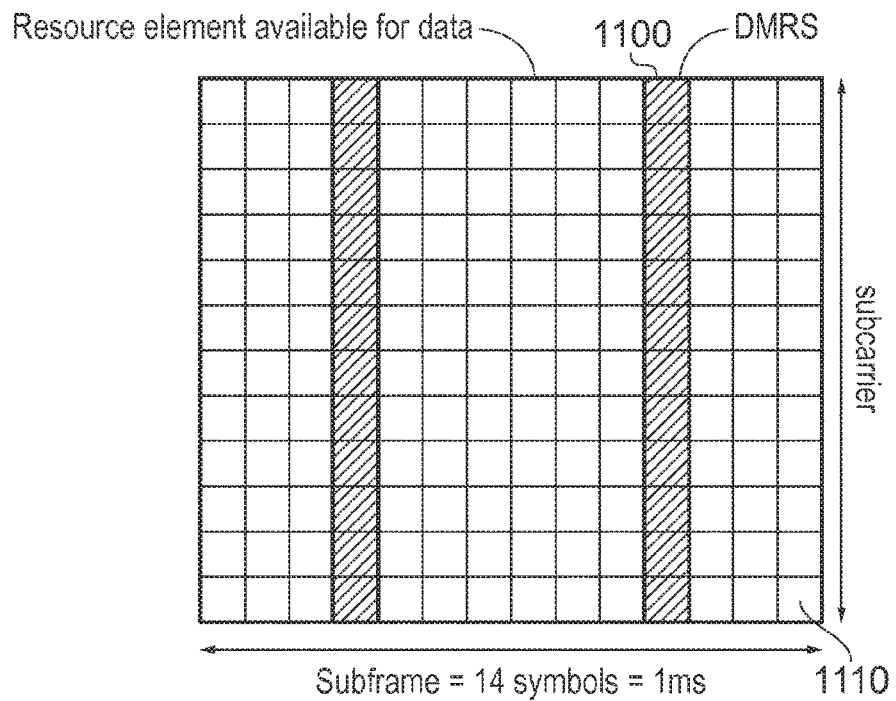
FIGS. 11-15 schematically illustrate transmission formats.

A general principal applicable to the selection of transmission formats in the present examples is that in response to a detection of low speed operation, a transmission format may be selected which provides a higher useful data rate but potentially a less robust transmission than a transmission format used where a higher speed is detected. For the higher speed formats, the data rate is potentially lower but the robustness to transmission artefacts (including, but not limited to, Doppler effects) is greater. Referring now to FIG. 11, so-called DMRS reference symbols (demodulation reference signal symbols) are shown as shaded blocks 1100, where one of the blocks in FIG. 11 represents a particular permutation of sub frame symbol and sub carrier. Resource elements available for data carriage are shown as unshaded blocks 1110.

The DMRS reference symbols are arranged in FIG. 11 to occupy adjacent frequency resources. That is to say, for any symbol position (along the horizontal axis) multiple adjacent sub carriers are occupied by DMRS reference symbols. This type of format can be useful for a frequency selective multipath channel, where the channel can potentially change rapidly in the sub carrier domain but does not generally vary rapidly in time. A terminal device receiving such a sub frame can estimate the channel accurately in the frequency domain, resolving channels that change significantly from sub carrier to sub carrier. The terminal device cannot necessarily estimate a channel that varies rapidly in the time domain from symbol to symbol.

The selection of which symbol positions are occupied by the DMRS reference symbols need not be as shown in the specific example of FIG. 11. The format shown in FIG. 11 is merely an example of such an arrangement.

Figure 12:
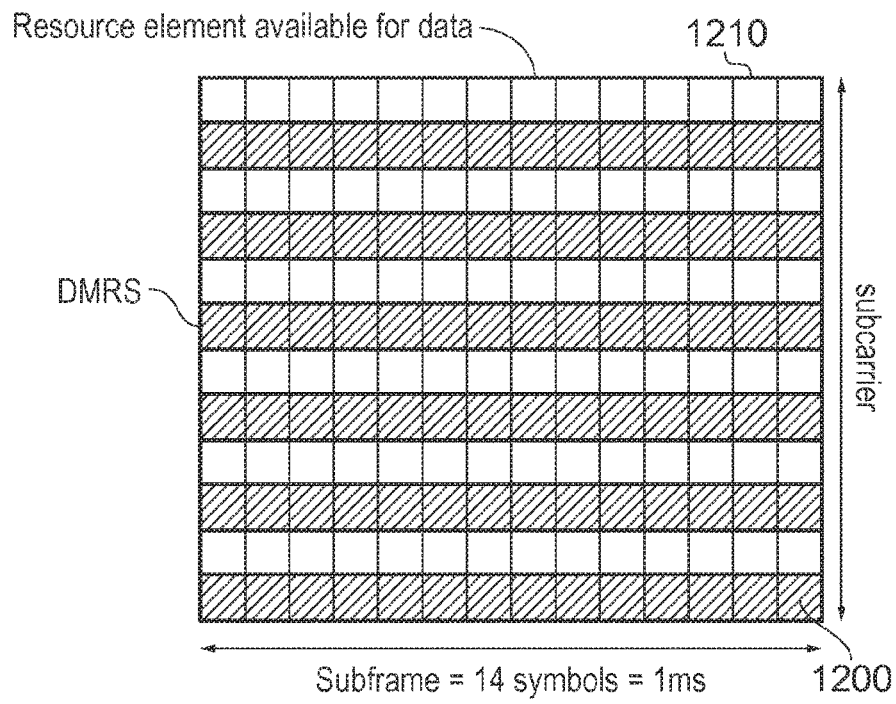

FIG. 12 is an example of a transmission format appropriate to the higher speed category. In FIG. 12, DMRS reference symbols (shaded blocks 1200 in the representation of FIG. 12) are arranged both in the time domain and in the frequency domain. A greater density of reference signals in the time domain allows the terminal device to obtain accurate channel estimates for channels that vary rapidly in time (for example, for vehicles that move at high speed and/or operate using a high carrier frequency). This format also has reference signals arranged in the frequency (or subcarrier domain), allowing the terminal device to channel-estimate frequency selective channels (for example, ones that may that vary significantly from subcarrier to subcarrier). This format is more tolerant to high physical speed channels, but has the potential disadvantage of having less resource (blocks 1210) available for data signals. Because of the lower useful data rate, in example arrangements this format of FIG. 12 is used only when necessary, such that a format containing fewer reference symbols and more data-bearing resource elements is used otherwise.

FIGS. 11 and 12 provide an example of the set of transmission formats comprising at least a first transmission format and a second transmission format; the first transmission format having a greater robustness to transmission artefacts but a lower usable data rate as compared to the second transmission format. In examples, which the controller is configured to select the first transmission format for speed information indicative of a range of speed above a first threshold speed.

Figure 13:
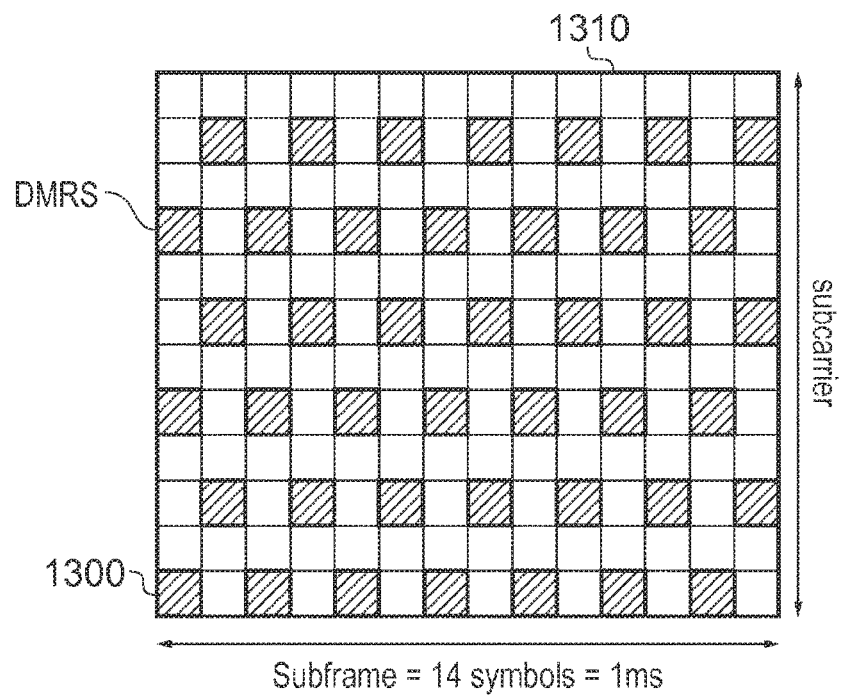

FIG. 13 uses the same representation (shaded blocks 1300 representing DMRS reference symbols and unshaded blocks 1310 representing resources usable for data carriage) to illustrate an example "medium speed" format. In the example arrangements discussed above, terminal device physical speed is categorized into three categories, low, medium and high. The format of FIG. 13 is an example of a transmission format applicable to the medium speed detection.

The format of FIG. 13 is in some respects a compromise between the low-speed format of FIG. 11 and the high-speed format of FIG. 12. This example format of FIG. 13 is not so tolerant of high Doppler speeds as the format of FIG. 12, but has a greater number of resource elements available for carriage of useful data. The format can tolerate the terminal devices moving at medium speeds as discussed above.

The transmission formats described with reference to FIGS. 11 to 13 provide a selection of three possible transmission formats, for low, high and medium detected physical speeds respectively. If instead only a "moving or not moving" test were applied (that is to say, low speed or high speed, or in other words "low speed" or "not low speed") then two of the three transmission formats as described could be used, for example the formats of FIGS. 11 and 12 respectively, though in other examples the two formats could be those of FIGS. 11 and 13 respectively.

Accordingly, terminal devices that are directly communicating with one another are, in examples, able to choose a suitable transmission format from among the low speed format, medium speed format and high speed formats shown in FIG. 11, FIG. 12 and FIG. 13.

Other possible formats for use at medium or high speed (or at least "not low speed") will now be described. As discussed above, the aim of these formats is to provide a potentially increased robustness (for example, to artefacts caused or made worse by high physical speed operation), though potentially at the expense of useful data carriage in comparison to the example format of FIG. 11.

FIG. 13 therefore provides an example of a third transmission format having: a greater robustness to transmission artefacts than the second transmission format but a lower robustness to transmission artefacts than the first transmission format; and a lower usable data rate than the second transmission format but a greater useable data rate than the first transmission format; the controller 520 being configured to select the third transmission format for speed information indicating a speed between a second threshold speed, lower than the first threshold, and the first threshold speed.

Reference is made to an example of FIG. 14, which again uses the same representation of useful data blocks 1410 being unshaded, but instead uses shaded blocks 1400 to represent resource elements applied to control channels. Instead of increasing the number of reference symbols to improve operation at high speeds, the system can operate with more robustly encoded control channel information.

The amount of robustness applied to the encoding of the control information can be varied as a function of the physical speed of the terminal device using the channel. At higher speeds, a greater level of redundancy can be applied to resources of the control channel. For example, the coding rate of the error correcting code applied to the control channel information can be reduced, or the amount of repetition applied to the control channel information can be increased so as to increase redundancy. The terminal device needs to decode the control channel information in order to be able to decode the data channel; there is generally no realistic possibility of decoding the data channel is the control channel is not correctly received.

Figure 14:
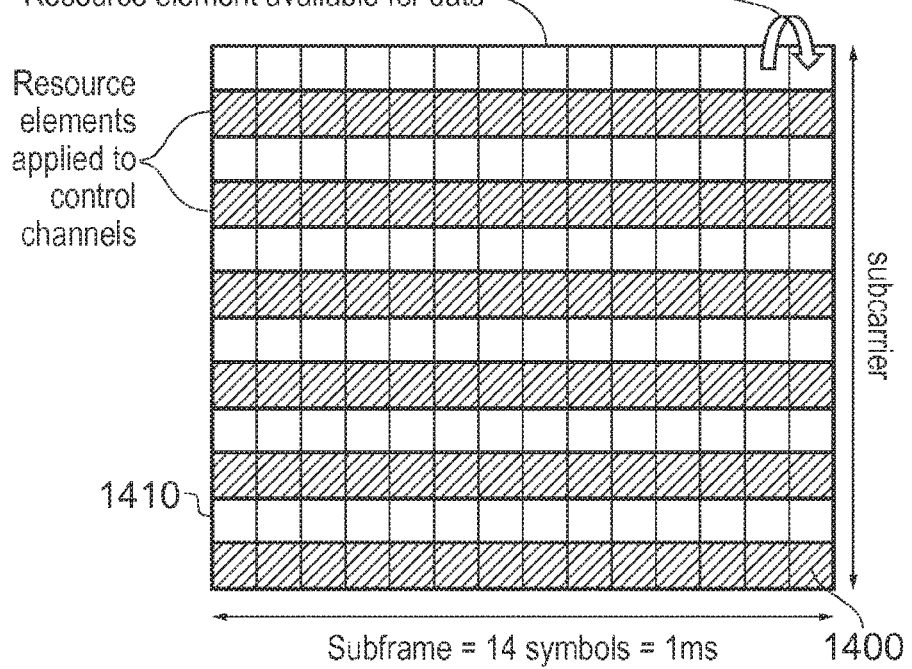

The control channel information shown in FIG. 14 can convey parameters relating to the structure of the data signal such as:
 a. The total number of resource blocks applied to the data transmission
 b. The modulation and coding scheme applied to the data transmission
 c. The terminal device to which the data transmission is destined
 d. The redundancy version of the transmission
 e. Piggybacked information (such as ACK/NACK information for previous transmissions)

The control channel information can contain a field allowing the recipient terminal device to detect the integrity of the control channel information. An example of such a field or code is a cyclic redundancy check (CRC) code. By checking the validity of this field, the receiving terminal device is able to detect whether the control channel information is correct. The receiving terminal device may in addition determine validity of the control channel information via other checks (such as by checking that the total number of resource blocks signalled in the data transmission is compatible with a capability of the transmitting terminal device).

Once the receiving terminal device has decoded the control channel and checked its validity, it can re-encode a corrected version of the control channel, compare the received symbols from the control channel with re-encoded symbols and use this comparison to perform channel estimation.

One potential format for the control channel that has increased robustness entails the control channel modulation symbols being differentially encoded, and this is shown as an example in FIG. 14.

In low speed channels, it is known that differential encoding leads to a performance degradation (of approximately 3 dB in some channels). The differentially encoded signal can however be decoded without the need for many reference signals and is suitable for use at high speeds (provided the amount of change in the channel from symbol to symbol is less than the change associated with the differential modulation). There may be some initial reference symbols that allow the differential encoding process to be bootstrapped (given a correct starting point), or there may be a definition known to both transmitter and receiver that the first modulation symbol of a stream is encoded as a difference to a known symbol (where that known symbol is not transmitted).

Figure 15:
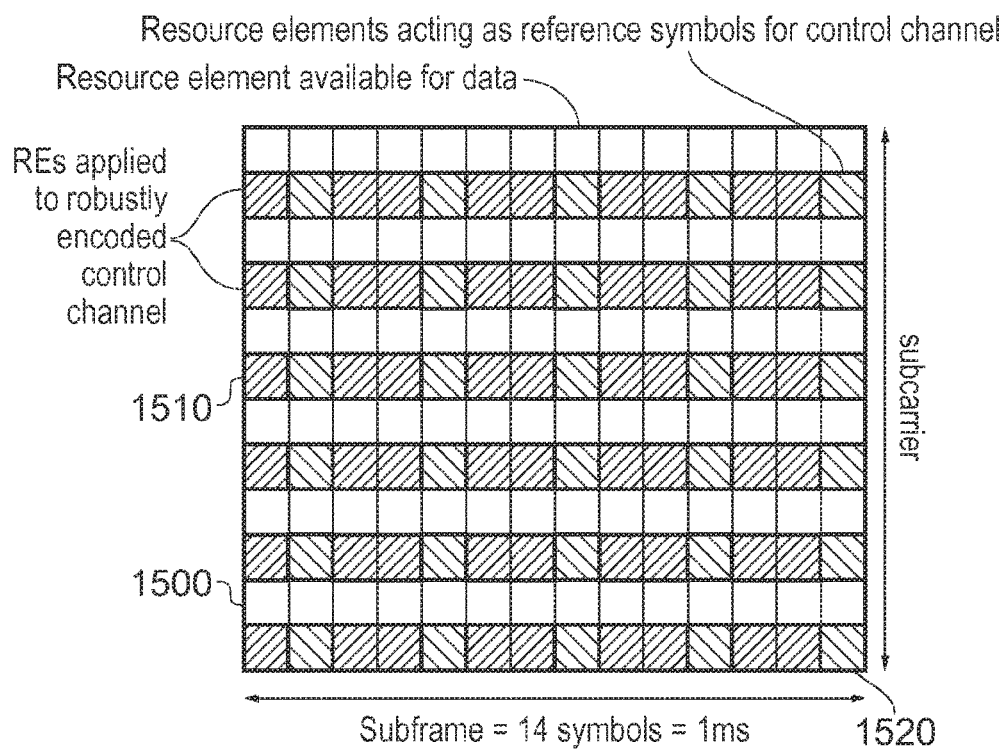

FIG. 15 is another example of a transmission format appropriate to higher physical speed operation. In FIG. 15, three types of resource elements are shown. Unshaded resource elements or blocks 1500 relate to the carriage of useful data. A first shading is applied to resource elements 1510 applied to a robustly encoded control channel, for example using one or more of the techniques discussed with reference to FIG. 14. A second shading is applied to resource elements 1520 providing reference symbols for the control channel.

Accordingly, in examples, the transmission formats differ from one another in at least one aspect selected from the list consisting of: the proportion of resource elements for use as reference symbols; whether reference symbols are adjacent by time or by frequency; and whether differential encoding is applied to control channel symbols.

Figure 16:
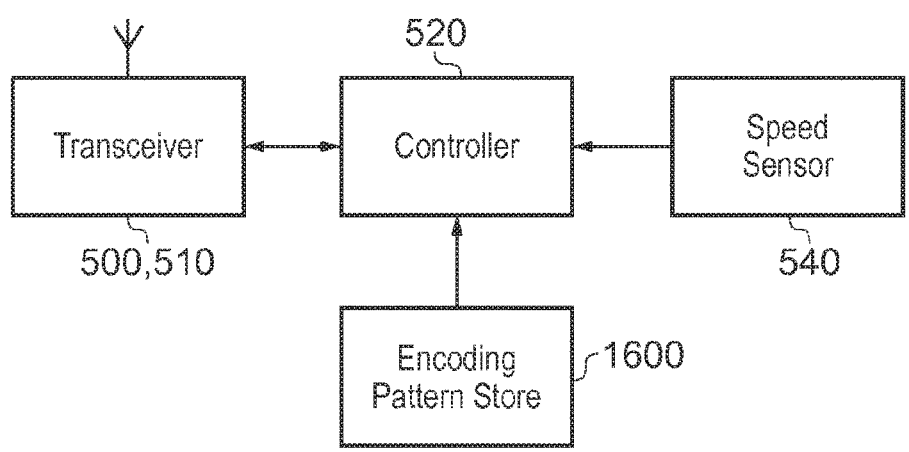
FIG. 16 schematically illustrates a terminal device.

FIG. 16 schematically illustrates a terminal device of the type discussed with reference to FIG. 5, in slightly more detail. The terminal device comprises the transceiver 500, 510, the controller 520, the speed sensor 540 and an encoding or transmission pattern store 1600 containing data specifying multiple (two or more) transmission formats amongst which the terminal device can select according to the speed announcement detection process discussed above. The terminal device of FIG. 16 is an example of a terminal device for use in a wireless telecommunications system, the terminal device comprising: a transceiver operable to perform wireless communication with one or more other terminal devices according to the wireless communications system and to receive speed information from the one or more other terminal devices indicative of a physical speed of the one or more other terminal devices; and a controller configured to select a transmission format, for use in wireless communication by the transceiver, in dependence upon the speed information received from the one or more other terminal devices.

Corresponding functions (apart from the transmission of its own speed announcement) can be carried out by a base station such as a roadside unit, forming an example of a base station for use in a wireless telecommunications system, the base station comprising: a transceiver operable to perform wireless communication with one or more terminal devices according to the wireless communications system and to receive speed information from the one or more terminal devices indicative of a physical speed of the one or more other terminal devices; and a controller configured to select a transmission format, for use in wireless communication by the transceiver and/or by the one or more terminal devices, in dependence upon the speed information received from the one or more terminal devices.

Figure 17:
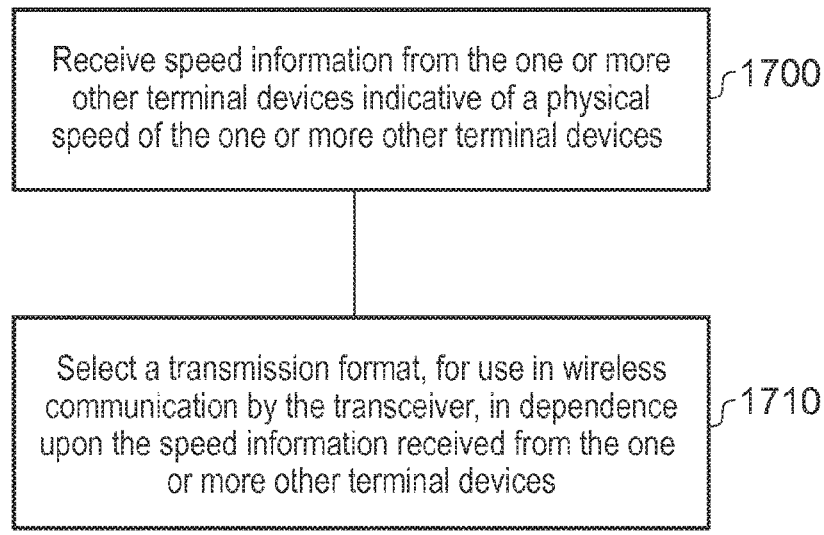
FIGS. 17 and 18 are schematic flowcharts illustrating methods of operation of terminal devices.

FIG. 17 is a schematic flowchart summarising a method of operation of a terminal device for use in a wireless telecommunications system, the terminal device having a transceiver operable to perform wireless communication with one or more other terminal devices according to the wireless communications system, the method comprising:

receiving (at a step 1700) speed information from the one or more other terminal devices indicative of a physical speed of the one or more other terminal devices; and selecting (at a step 1710) a transmission format, for use in wireless communication by the transceiver, in dependence upon the speed information received from the one or more other terminal devices.

Figure 18:
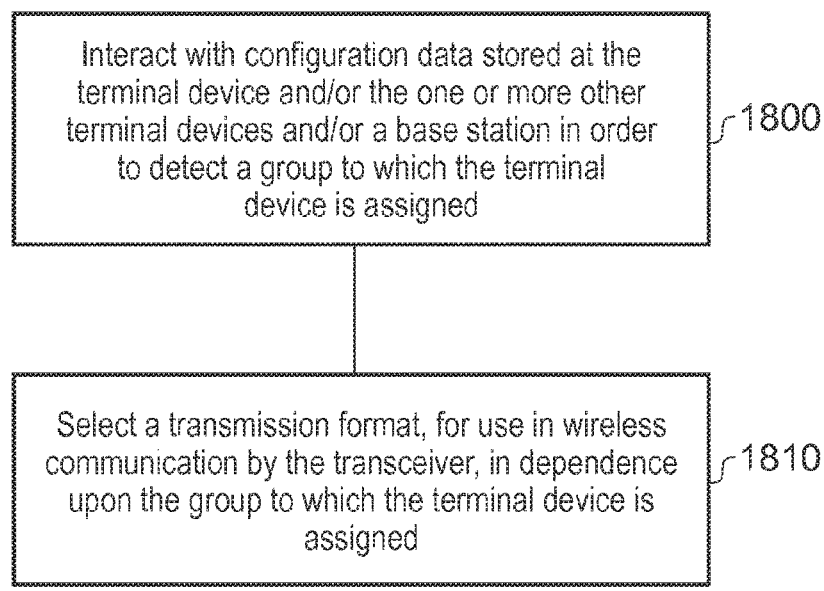

FIG. 18 is a schematic flowchart summarising a method of operation of a terminal device for use in a wireless telecommunications system, the terminal device having a transceiver operable to perform wireless communication with one or more other terminal devices according to the wireless communications system, the method comprising:

interacting (at a step 1800) with configuration data stored at the terminal device and/or the one or more other terminal devices and/or a base station in order to detect a group to which the terminal device is assigned; and selecting (at a step 1810) a transmission format, for use in wireless communication by the transceiver, in dependence upon the group to which the terminal device is assigned.

Figure 19:
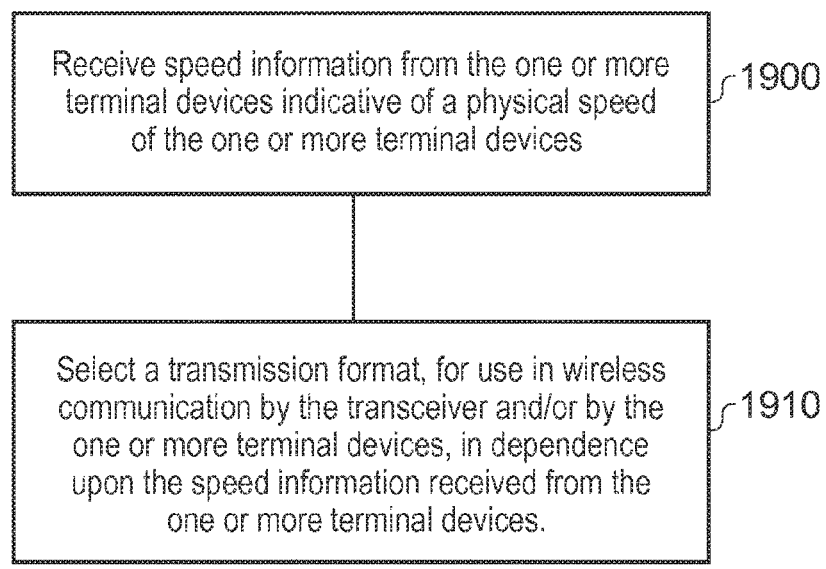
FIG. 19 is a schematic flowchart illustrating a method of operation of a base station.

As mentioned above, the (or a) base station such as, for example, a road side unit, can react in a similar way to the terminal devices as discussed above, and/or can oversee or control the choice of transmission format by one or more terminal devices. FIG. 19 is a schematic flowchart summarising a method of operation of a base station for use in a wireless telecommunications system, the base station having a transceiver operable to perform wireless communication with one or more terminal devices according to the wireless communications system; the method comprising:

receiving (at a step 1900) speed information from the one or more terminal devices indicative of a physical speed of the one or more other terminal devices; and selecting (at a step 1910) a transmission format, for use in wireless communication by the transceiver and/or by the one or more terminal devices, in dependence upon the speed information received from the one or more other terminal devices.

The operations of the terminal device and the base station as described may be carried out by the respective controller interacting with the transmitter and receiver (which collectively provide a respective transceiver). The functions may be performed (in examples) at least in part by computer software, such as computer software stored on a non-transitory machine-readable storage medium (such as a magnetic or optical disk) being run by (or used to control operations of) a computer.

Where methods of processing, coding or decoding are discussed above, it will be appreciated that apparatus configured to perform such methods are also considered to represent embodiments of the disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective aspects and features of embodiments of the disclosure are defined by the following numbered clauses:

1. A terminal device for use in a wireless telecommunications system, the terminal device comprising:

a transceiver operable to perform wireless communication with one or more other terminal devices according to the wireless communications system and to receive speed information from the one or more other terminal devices indicative of a physical speed of the one or more other terminal devices; and a controller configured to select a transmission format, for use in wireless communication by the transceiver, in dependence upon the speed information received from the one or more other terminal devices.

2. A terminal device according to clause 1, comprising a speed detector to detect speed information indicative of a physical speed of the terminal device.

3. A terminal device according to clause 2, in which the controller is configured to select a transmission format, for use in wireless communication by the transceiver, in dependence upon a detection of a highest speed amongst the speed information.

4. A terminal device according to clause 2 or clause 3, in which the controller is configured to control the transceiver to transmit the speed information indicative of the physical speed of the terminal device to the one or more other terminal devices.

5. A terminal device according to any one of the preceding clauses, in which the controller is configured to select a transmission format from a set of formats having different respective robustness to transmission artefacts.

6. A terminal device according to clause 5, in which the set of transmission formats comprises at least a first transmission format and a second transmission format;

the first transmission format having a greater robustness to transmission artefacts but a lower usable data rate as compared to the second transmission format.

7. A terminal device according to clause 6, in which the controller is configured to select the first transmission format for speed information indicative of a range of speed above a first threshold speed.

8. A terminal device according to clause 7, in which the set of transmission formats comprises a third transmission format having:

a greater robustness to transmission artefacts than the second transmission format but a lower robustness to transmission artefacts than the first transmission format; and a lower usable data rate than the second transmission format but a greater useable data rate than the first transmission format;

the controller being configured to select the third transmission format for speed information indicating a speed between a second threshold speed, lower than the first threshold, and the first threshold speed.

9. A terminal device according to any one of clauses 5 to 7, in which the transmission formats differ from one another in at least one aspect selected from the list consisting of:

the proportion of resource elements for use as reference symbols;

whether reference symbols are adjacent by time or by frequency; and whether differential encoding is applied to control channel symbols.

10. A terminal device according to any one of clauses 4 to 9, in which:

the speed information is transmitted periodically by the one or more other terminal devices; and the controller is configured to control the transceiver to transmit the speed information indicative of the physical speed of the terminal device periodically to the one or more other terminal devices.

11. A terminal device according to clause 10, in which a periodicity of transmission is shorter for speed information indicative of a higher speed, compared to a periodicity of transmission for speed information indicative of a lower speed.

12. A terminal device according to clause 10 or clause 11, in which the controller is configured to detect the speed information from the one or more other terminal devices from a transmission in one or more predetermined frequency bands and at one or more predetermined times.

13. A terminal device according to clause 12, in which:
the controller is configured to detect a transmission in each of plurality of predetermined frequency bands, each corresponding to a different range of physical speeds of the one or more other terminal devices; and
the controller is configured to transmit speed information relating to the speed of the terminal device in one or the plurality of predetermined frequency bands selected according to the detected speed of the terminal device.

14. A terminal device according to clause 13, in which, for transmission and/or reception in a frequency band indicative of a higher speed, the controller is configured to use transmission or reception parameters which are different to those for use in respect of a frequency band indicative of a lower speed.

15. A terminal device according to any one of clauses 5 to 14, wherein the plurality of frequency bands comprises two or more groups of frequency bands, each corresponding to a different group of terminal devices.

16. A terminal device according to clause 15, in which the controller is configured to interact with configuration data stored at the terminal device and/or the one or more other terminal devices and/or a base station in order to detect one or more groups to which the terminal device is assigned.

17. A terminal device according to clause 16, in which the controller is not responsive to speed information indicative of the speed of one or more other terminal devices in a different group to the group assigned to the terminal device.

18. A terminal device according to any one of clauses 15 to 17, in which the configuration data is indicative of a type of vehicle with which the terminal device is associated.

19. A terminal device according to any one of clauses 16 to 18, in which the controller is configured to detect, from the base station, a type of location of the terminal device, the group being assigned to the terminal device according to the type of location.

20. A terminal device for use in a wireless telecommunications system, the terminal device comprising:
a transceiver operable to perform wireless communication with one or more other terminal devices according to the wireless communications system and to interact with configuration data stored at the terminal device and/or the one or more other terminal devices and/or a base station in order to detect a group to which the terminal device is assigned; and
a controller configured to select a transmission format, for use in wireless communication by the transceiver, in dependence upon the group to which the terminal device is assigned.

21. A method of operation of a terminal device for use in a wireless telecommunications system, the terminal device having a transceiver operable to perform wireless communication with one or more other terminal devices according to the wireless communications system, the method comprising:
receiving speed information from the one or more other terminal devices indicative of a physical speed of the one or more other terminal devices; and
selecting a transmission format, for use in wireless communication by the transceiver, in dependence upon the speed information received from the one or more other terminal devices.

22. Computer software which, when executed by a computer, causes the computer to perform the method of clause 21.

23. A storage medium which stores computer software according to clause 22.

24. A method of operation of a terminal device for use in a wireless telecommunications system, the terminal device having a transceiver operable to perform wireless communication with one or more other terminal devices according to the wireless communications system, the method comprising:
interacting with configuration data stored at the terminal device and/or the one or more other terminal devices and/or a base station in order to detect a group to which the terminal device is assigned; and
selecting a transmission format, for use in wireless communication by the transceiver, in dependence upon the group to which the terminal device is assigned.

25. Computer software which, when executed by a computer, causes the computer to perform the method of clause 24.

26. A storage medium which stores computer software according to clause 25.

27. A base station for use in a wireless telecommunications system, the base station comprising:
a transceiver operable to perform wireless communication with one or more terminal devices according to the wireless communications system and to receive speed information from the one or more terminal devices indicative of a physical speed of the one or more other terminal devices; and
a controller configured to select a transmission format, for use in wireless communication by the transceiver and/or by the one or more terminal devices, in dependence upon the speed information received from the one or more terminal devices.

28. A method of operation of a base station for use in a wireless telecommunications system, the base station having a transceiver operable to perform wireless communication with one or more terminal devices according to the wireless communications system; the method comprising:
receiving speed information from the one or more terminal devices indicative of a physical speed of the one or more other terminal devices; and
selecting a transmission format, for use in wireless communication by the transceiver and/or by the one or more terminal devices, in dependence upon the speed information received from the one or more terminal devices.

29. Computer software which, when executed by a computer, causes the computer to perform the method of clause 28.

30. A storage medium which stores computer software according to clause 29.

31. A telecommunications system comprising a terminal device according to any one of clauses 1 to 20 and a base station according to claim 27.

The invention claimed is:

1. A terminal device for use in a wireless telecommunications system, the terminal device comprising:
   circuitry configured to
      perform wireless communication with one or more other terminal devices according to the wireless communications system;
      receive speed information from the one or more other terminal devices indicative of a physical speed of the one or more other terminal devices; and
      select a transmission format for use in wireless communication based on the speed information received from the one or more other terminal devices.

2. The terminal device according to claim 1, wherein the circuitry is configured to detect speed information indicative of a physical speed of the terminal device.

3. The terminal device according to claim 2, wherein the circuitry is configured to select a transmission format for use in wireless communication based on a detection of a highest speed amongst the speed information.

4. The terminal device according to claim 2, wherein the circuitry is configured to control transmission of the speed information indicative of the physical speed of the terminal device to the one or more other terminal devices.

5. The terminal device according to claim 4, wherein the speed information is transmitted periodically by the one or more other terminal devices; and
   the circuitry is configured to control transmission of the speed information indicative of the physical speed of the terminal device periodically to the one or more other terminal devices.

6. The terminal device according to claim 5, wherein a periodicity of transmission is shorter for speed information indicative of a higher speed, compared to a periodicity of transmission for speed information indicative of a lower speed.

7. The terminal device according to claim 5, wherein the circuitry is configured to detect the speed information from the one or more other terminal devices from a transmission in one or more predetermined frequency hands and at one or more predetermined times.

8. The terminal device according to claim 7, wherein the circuitry is configured to;
   detect a transmission in each of plurality of predetermined frequency bands, each corresponding to a different range of physical speeds of the one or more other terminal devices; and
   control transmission of speed information relating to the speed of the terminal device in one or the plurality of predetermined frequency hands selected according to the detected speed of the terminal device.

9. The terminal device according to claim 8, wherein for transmission and/or reception in a frequency band indicative of a higher speed, the circuitry is configured to use transmission or reception parameters which are different to those for use in respect of a frequency band indicative of a lower speed.

10. The terminal device according to claim 1, wherein the circuitry is configured to select a transmission format from a set of formats having different respective robustness to transmission artefacts.

11. The terminal device according to claim 10, wherein the set of transmission formats comprises at least a first transmission format and a second transmission format, and the first transmission format has a greater robustness to transmission artefacts but a lower usable data rate as compared to the second transmission format.

12. The terminal device according to claim 11, wherein the circuitry is configured to select the first transmission format for speed information indicative of a range of speed above a first threshold speed.

13. The terminal device according to claim 12, wherein the set of transmission formats comprises a third transmission format having:
   a greater robustness to transmission artefacts than the second transmission format but a lower robustness to transmission artefacts than the first transmission format; and
   a lower usable data rate than the second transmission format but a greater useable data rate than the first transmission format; and
   the circuitry is configured to select the third transmission format for speed information indicating a speed between a second threshold speed, lower than the first threshold, and the first threshold speed.

14. The terminal device according to claim 10, wherein the transmission formats differ from one another in at least one aspect selected from the list consisting of:
   the proportion of resource elements for use as reference symbols;
   whether reference symbols are adjacent by time or by frequency; and
   whether differential encoding is applied to control channel symbols.

15. The terminal device according to claim 5, wherein the plurality of frequency bands comprises two or more groups of frequency bands, each corresponding to a different group of terminal devices.

16. The terminal device according to claim 15, wherein the circuitry is configured to interact with configuration data stored at the terminal device and/or the one or more other terminal devices and/or a base station to detect one or more groups to which the terminal device is assigned.

17. The terminal device according to claim 16, wherein the circuitry controller is not responsive to speed information indicative of the speed of one or more other terminal devices in a different group to the group assigned to the terminal device.

18. The terminal device according to claim 16, wherein the circuitry is configured to detect, from the base station, a type of location of the terminal device, the group being assigned to the terminal device according to the type of location.

19. The terminal device according to claim 15, wherein the configuration data is indicative of a type of vehicle with which the terminal device is associated.

20. A terminal device for use in a wireless telecommunications system, the terminal device comprising:
   circuitry configured to
      perform wireless communication with one or more other terminal devices according to the wireless communications system;
      interact with configuration data stored at the terminal device and/or the one or more other terminal devices and/or a base station to detect a group to which the terminal device is assigned; and
      select a transmission format for use in wireless communication based on the group to which the terminal device is assigned.

21. A method of operation of a terminal device for use in a wireless telecommunications system, the terminal device having a transceiver operable to perform wireless communication with one or more other terminal devices according to the wireless communications system, the method comprising:
   receiving speed information from the one or more other terminal devices indicative of a physical speed of the one or more other terminal devices; and
   selecting a transmission format, for use in wireless communication by the transceiver, in dependence upon the speed information received from the one or more other terminal devices.

\* \* \* \* \*